United States Patent [19]

Varian

[11] 3,767,964

[45] Oct. 23, 1973

[54] DRIVING CIRCUIT FOR MAGNETIC FIELD DEFLECTION COIL

[75] Inventor: George R. Varian, Palo Alto, Calif.

[73] Assignee: Ampex Corporation, Redwood City, Calif.

[22] Filed: Dec. 2, 1970

[21] Appl. No.: 94,243

[52] U.S. Cl. ............................ 315/27 TD, 313/75

[51] Int. Cl. ............................ H01j 29/76

[58] Field of Search ............... 315/27 R, 18, 27 TD; 313/75

[56] References Cited

UNITED STATES PATENTS

| | | | |
|---|---|---|---|
| 3,221,269 | 11/1965 | Davies | 315/27 TD |
| 3,378,720 | 4/1968 | Duerr et al. | 315/27 R |
| 3,144,581 | 8/1964 | Greenburg et al. | 315/27 TD |
| 3,388,285 | 6/1968 | Christopher et al. | 315/27 R |
| 3,111,602 | 11/1963 | Hellstrom et al. | 315/27 TD |

*Primary Examiner*—Carl D. Quarforth
*Assistant Examiner*—E. E. Lehmann
*Attorney*—Robert G. Clay

[57] ABSTRACT

A feedback stabilized drive circuit is provided in which the instantaneous current flow through an electron beam deflection coil is measured indirectly by sampling resistors which are electrically isolated from the immediate coil circuit to insure stability of the sampled current. The current sampling is employed to develop a relatively large amount of d.c. feedback across a high gain amplifier having an input for receiving the coil scanning signal and having an output consisting of a pair of transistors connected in a Darlington configuration for providing the necessary drive current to the deflection coil and for isolating the current sampling resistors from the immediate coil circuit.

2 Claims, 2 Drawing Figures

INVENTOR.
GEORGE R. VARIAN
BY [signature]
ATTORNEY

DRIVING CIRCUIT FOR MAGNETIC FIELD DEFLECTION COIL

In general, the present invention relates to circuits for driving a selected amount of current through a inductive component and more particularly to a circuit for driving a magnetic field deflection coil, such as employed in electron beam devices, in response to a scanning signal.

While the coil drive circuit of the present invention is capable of being used to advantage in a variety of electron beam scanning devices, it has been found particularly useful in accurately controlling the scanning patterns of an electron beam video camera tube. For example, in most color video cameras, a plurality of three light pick-up tubes are employed in a fixed array, one for each of the three primary colors, red, blue and green. In order to insure a fidelity color video picture, it is necessary to operate the three video tubes such that their electron beams scan particular points on the respective tube screens in unison. This in turn requires that the circuit for driving the beam deflection coils in each of the tubes function with accuracy and stability at the high-frequency scanning rates characteristic of television signals. More particularly, it is desired to control the scanning point of the electron beam with precision in response to a given input signal, whereby the input signal itself can be adjusted to meet the scanning registration criteria noted above. Of primary concern in this regard is the circuit employed for driving the horizontal beam deflection coil, as it receives the highest frequency scan rate.

In the past, horizontal deflection circuits for camera deflection coils did not contain adequate feedback and tended to suffer from poor temperature stability. Improvements on these older circuits resulted in employing a sampling resistor in series with the yoke coil; but the advantages of this arrangement were found limited by reason of substantial phase shifting of the series coil signal which in turn significantly limited the permissible feedback loop gain. A restricted loop gain allowed for an adequate high frequency response but of course significantly reduced the accuracy of the beam scanning registration.

Figure 1:
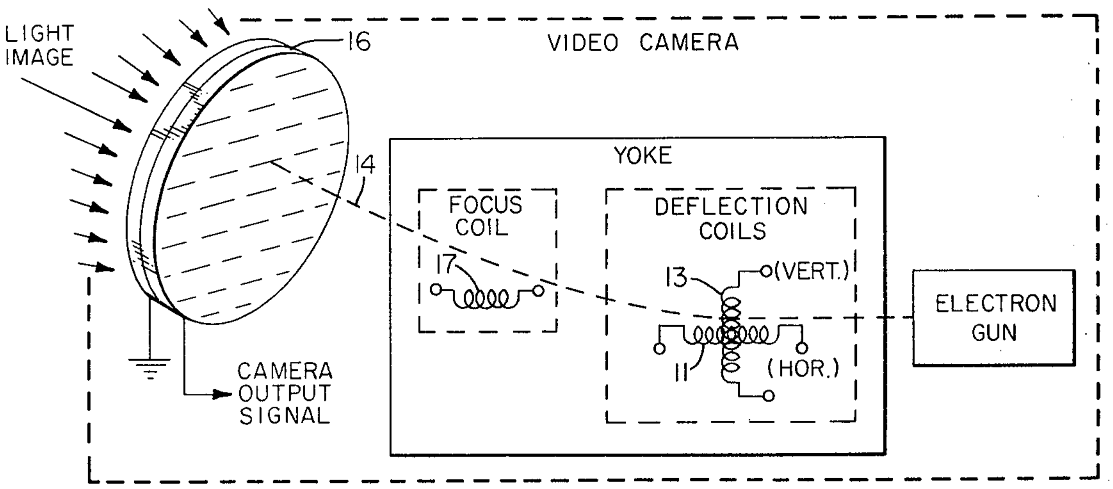
Figure 2:
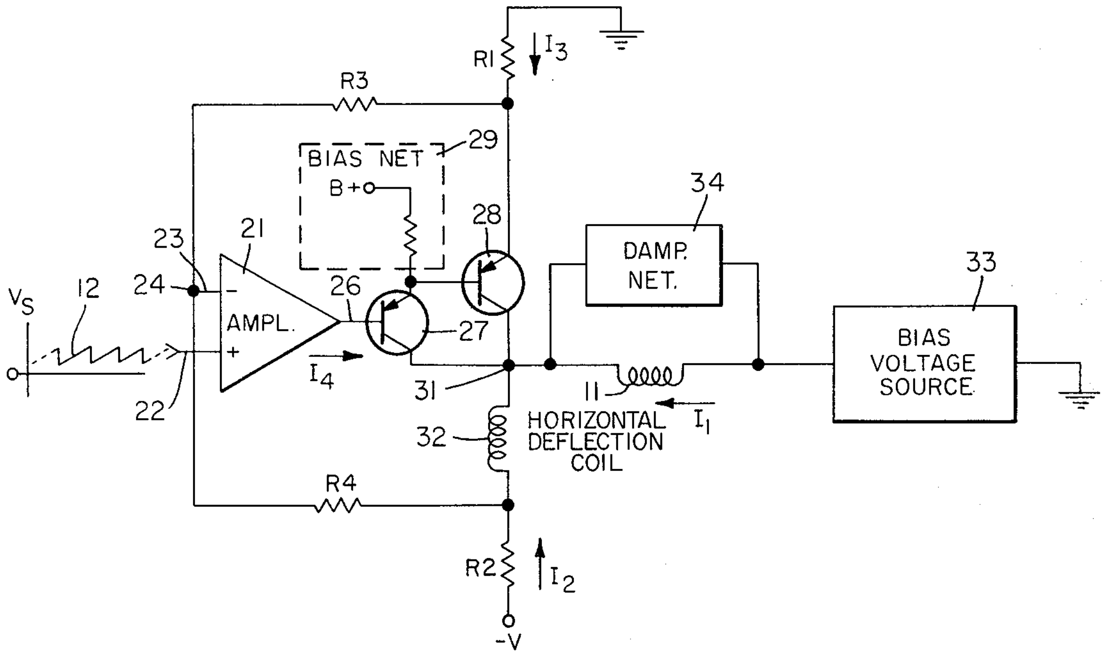

The present invetnion, which surmounts the foregoing disadvantages of prior art circuits, is fully described by the following specification and is illustrated by the accompanying drawings of the presently preferred embodiment of the invention, wherein:

FIG. 1 is a generalized schematic diagram of a video camera illustrating the deflection coils of a video camera tube and thus showing the environment in which the present invention has been found most useful; and FIG. 2 is a composite block and schematic diagram illustrating the deflection coil driving circuit constructed in accordance with the present invention.

With reference to FIGS. 1 and 2, the drive circuit of the present invention as shown in FIG. 2 is adapted for selectively energizing a horizontal deflection coil 11 in response to the instantaneous magnitude of a scanning control signal 12, in this instance consisting of a sawtooth waveform. A similar circuit could be used for the vertical deflection coil 13, however the frequency response requirements thereof are not nearly so stringent. Horizontal deflection coil 11 must be operated at a rapid rate to cause an electron beam 14 to fly back and forth across the face of a solid state photoconductive camera screen 16 while vertical deflection coil 13 slowly moves the horizontally scanning beam 14 in the orthogonal direction at a much lower vertical scan rate. Focus coil 17 is an essentially d.c. operated component with the driving circuit therefor merely requiring an initial set-up adjustment.

With reference to FIG. 2, the drive circuit of the present invention is primarily characterized by the use of a pair of current sampling resistors $R_1$ and $R_2$, which for reasons described more fully herein, function to accurately monitor or measure the instantaneous current flow $I_1$ through coil 11. As resistors $R_1$ and $R_2$ are substantially impedance isolated from the immediate circuit path of coil 11, the sampling operation is not subject to instabilities due, for example, to phase shifting of the signal flowing through the coil. This feature in turn allows the circuit to employ a substantial amount of d.c. feedback for highly accurate control of the deflection coil current in response to the magnitude of the input scanning signal 12.

Considering the construction and operation of the present invention in detail, a high gain (operational) amplifier 21 is connected with one of its inputs 22 disposed to receive scanning signal 12. In this instance, signal 12 consists of a sawtooth voltage waveform superimposed on a d.c. bias signal. While in this instance signal 12 is applied to the positive input 22 of amplifier 21, it could equally be applied to the negative phase input 23 of the amplifier with the positive input 22 grounded and with the phase of the scanning signal inverted. In such case, junction 24 may be used as a summing junction for the sawtooth voltage and d.c. bias voltage components of scanning signal 12.

Amplifier 21 may be provided by any of a variety of circuit designs having a high slew rate, fast settling time and a gain of approximately 1,000 or greater.

An output 26 of amplifier 21 is coupled to transistors 27 and 28 connected in a Darlington pair configuration. Particularly, the base of transistor 27 is connected to amplifier output 26 while the base of transistor 28 is coupled to the emitter of transistor 27. A bias current is developed by network 29 and applied to the emitter and base electrodes of transistors 27 and 28 respectively in order to facilitate turn-off of transistor 28 during fly-back. The collectors of both transistors 27 and 28 are jointly connected at junction 31 and from there to one end of coil 11 to thus serve as the electrical control point for the current flow $I_1$ through the deflection coil. The emitter current of transistor 28 is measured by a voltage developed across sampling resistor $R_1$, where such sampled voltage is fed back to the negative input 23 of amplifier 21 over a feedback path comprising resistor $R_3$. Resistor $R_1$ technically provides emitter degeneration for the Darlington transistor pair. Similar feedback and sampling networks are extended from junction 31 of the transistor collectors, in this instance through a fly-back facilitating inductor 32. Inductor 32 couples junction 31 in a feedback network consisting of a feedback resistor $R_4$ which returns to negative phase input 23 of amplifier 21. The sampling circuit in this instance is provided by resistor $R_2$ connected between a minus voltage supply (−V) and the junction of feedback resistor $R_4$ and inductor 32.

The end of horizontal deflection coil 11 opposite junction 31 is extended to a bias voltage source 33 which issues a bias voltage of preselected potential for coil 11 such that the drive circuit controlling the potential at junction 31 is biased to the center of its operating range.

A damping network 34 consisting of a conventional capacitive-resistive design is connected in parallel across deflection coil 11 to attenuate certain high frequency ringing effects.

In operation, the current $I_1$ through coil 11 is related to the input voltage $V_s$ of the scanning signal in accordance with the following considerations. By virtue of summing the various currents at junction 31, the following equation is derived:

$$I_1 + I_2 + I_3 + I_4 = 0$$

where $I_1$ is the current through coil 11, $I_2$ is the current flow through resistor $R_2$; $I_3$ is the current flow through resistor $R_1$; and $I_4$ is the current flow into the base of transistor 27. Current $I_4 = I_2/\beta_1\ \beta_2$ where $\beta_1\ \beta_2$ is the product of the current gains of transistors 27 and 28, typically on the order of 1,000. Thus $I_4$ is negligible relative to $I_1$, $I_2$ and $I_3$. Accordingly, if the sampling and feedback resistors are selected such that $R_1/R_3 = R_2/R_4$, then the current $I_1 = KV_s$ where $K = (R_3 + R_4)/R_1R_4$.

In the above equations, the current developed by bias network 29 has been intentionally ignored because its substantially constant and relatively low magnitude render it insignificant in the various calculations.

It is noted that the coil current $I_1$ is thus determined by the sampling resistor currents $I_2$ and $I_3$ which in turn are precisely proportional to the input scanning voltage $V_s$. If current $I_1$ tends to drift away from its proper value, the voltage at junction 31 is automatically adjusted in one or the other direction so as to increase or decrease the deflection coil current to a magnitude proportional to $V_s$ in accordance with the above equation. Thus, the amount of deflection or deflection drive current $I_1$ accurately tracks the input scanning waveform.

It will be observed that sampling resistors $R_1$ and $R_2$ are substantially isolated from coil 11 by the high impedance of the collector-emitter path of transistor 28 and the high a.c. impedance of inductor 32, respectively. Thus, junction 31 appears as a high impedance or current source for driving the coil. At the same time transistor 28 and inductor 32 isolate the sampling resistors $R_1$ and $R_2$ from certain high frequency instability effects exhibited by coil 11. In this latter regard, the horizontal deflection coil exhibits resonance at certain frequencies close to the horizontal scan frequency (typically set at 15K Hertz), and it is desirable to block or isolate these resonances from the sensing and feedback portions of the drive circuit. As indicated above, this feature is served very well by transistor 28 and inductor 32.

While it is true that bias voltage source 33 is subject to temperature drift and ripple (low frequency fluctuations), such fluctuations do not affect the precision control over coil current $I_1$. Current $I_1$ is continuously sampled and controlled such that its value corresponds to that dictated by the magnitude of the input scanning signal $V_s$. Thus, a drift in the voltage magnitude output of source 33 results in a compensatory change in the operating potential at junction 31.

A further advantage of the present invention is the d.c. coupling between the input signal and the deflection coil. By virtue of this feature, low frequency errors in the deflection coil operation, such as lack of orthogonality between the horizontal and vertical scans and centering, are easily corrected by adding low frequency or d.c. correction signals to the input scanning signal 12. Still further, by reason of the d.c. coupling, the circuit does not require a dual voltage supply for the output stage.

Furthermore, inductor 32 has been found advantageous in facilitating rapid fly-back deflection for coil 11 in response to sawtooth scanning signal 12. In particular, inductor 32 acts as a current source such that it is capable of providing the necessary and relatively high voltage at junction 31 in response to the abrupt voltage swing of the sawtooth input signal $V_s$ for driving coil 11 in the reverse direction.

While the above described embodiment has been found advantageous and thus preferred for driving a horizontal deflection coil in response to a sawtooth scanning waveform, a modified version of this circuit would be preferred for a cathode ray tube x-y display in which precision scanning control in both the horizontal and vertical directions is desired. In such case, inductor 32 would be replaced by another Darlington pair of transistors arranged in symmetrical relation to the Darlington pair of transistors 27 and 28 such that all of the collectors of the four transistors would be connected to junction 31 while output 26 of amplifier 21 would be coupled jointly to the base of transistor 27 and the base of the corresponding transistor of the additional Darlington pair. With such a modification, the sampling resistors $R_2$ would be provided with impedance isolation from coil 11 even at d.c. and low frequencies in the same manner described above for resistor $R_1$.

What is claimed is:

1. A circuit for driving a magnetic field deflection coil in response to an input scanning signal including an amplifier having an input for receiving said scanning signal and an output; a pair of first and second transistors connected in a Darlington configuration with a base of the first transistor connected to the output of said amplifier, an emitter of said first transistor connected to a base of the second transistor and collectors of said first and second transistors jointly connected to one end of said deflection coil; and an electrical bias source connected to the other end of said deflection coil; the combination therewith comprising:

a feedback network including a first feedback resistor connected between the emitter of said second transistor and an input of said amplifier and a second feedback resistor coupled between an input of said amplifier and the jointly connected one end of said deflection coil and collectors of said transistors; and a sampling network including a first sampling resistor connected between one potential reference and the connection between said first feedback resistor and the emitter of said second transistor and a second sampling resistor connected between a different potential reference and the coupling between said second feedback resistor and the jointly connected one end of said deflection coil and collectors of said transistors whereby negative feedback is provided to said amplifier which responsively controls the current flow through said coil by causing the current flow in said sampling resistors to vary in accordance with the provided input scanning signal and feedback.

2. The circuit as defined in claim 1 further comprising, an inductor interposed between the jointly connected collectors of said transistors and the connection between said second feedback resistor and said sampling resistor for facilitating fly-back current drive of said coil in response to a sawtooth scanning signal.

* * * * *